Feb. 8, 1944.   R. WIEDERKEHR   2,341,066
METAL PIPE
Filed June 24, 1943
Fig. 1
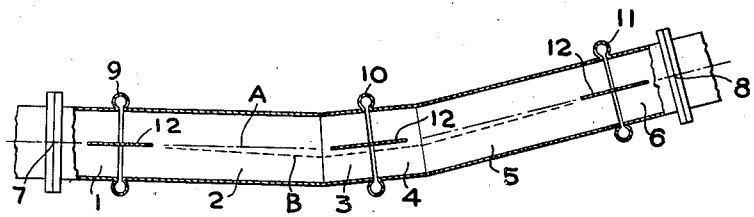
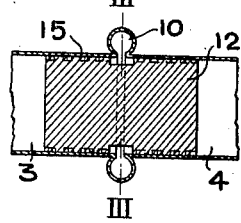
Fig. 2
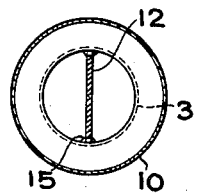
Fig. 3
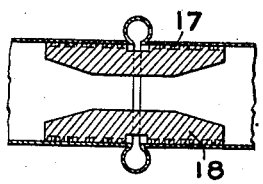
Fig. 4
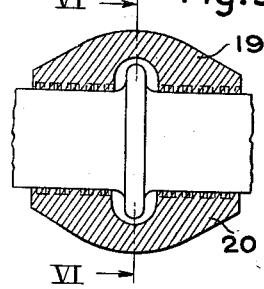
Fig. 5
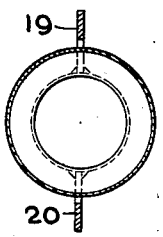
Fig. 6
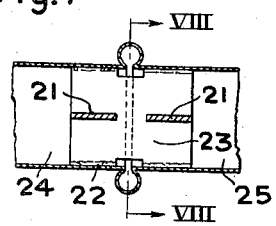
Fig. 7
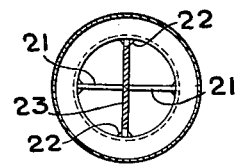
Fig. 8
Inventor
Robert Wiederkehr
By
Dodge
Attorneys Patented Feb. 8, 1944

2,341,066

UNITED STATES PATENT OFFICE 2,341,066

METAL PIPE

Robert Wiederkehr, Erlenbach, Switzerland, assignor to Aktiengesellschaft Fuer Technische Studien, Zurich, Switzerland, a corporation of Switzerland Application June 24, 1943, Serial No. 492,114
In Switzerland February 28, 1942

4 Claims. (Cl. 138—50)

This invention relates to a metal pipe with at least three flexible joints provided at points between its ends, each of said joints being designed as a bellows joint having only one corrugation. In such pipes the various sections already united with one another by the flexible joints are often additionally connected by special tension members adapted to take up the tensile stresses exerted on the various pipe sections, so that such stresses are not transmitted to the connecting points at the two ends of the pipe. Tension members of this kind have hitherto been designed as hinged bolts, tie rods and the like. Such connections are not, however, suitable for all purposes, for example, for the pipes of gas turbines which are usually subjected to high temperatures (500° C. and over) and, when of large output, involve pipes of considerable diameter, for instance, 1000 mm. and over, so that tension members of the kind referred to would have to be made of such large dimensions that they would prove far too cumbersome and heavy.

To overcome this drawback the tension members according to the present invention are designed as thin, flexible plates and are arranged in a plane passing through the longitudinal axis of the pipe. Such thin tension plates allow the pipe sections, which are connected by flexible joints to the adjacent parts, to deflect in a direction transverse to the longitudinal axis of the pipe.

The accompanying drawing shows by way of example various constructional embodiments of the subject matter of the invention.

In this drawing:

Fig. 1 shows for the greater part an axial longitudinal section through a pipe provided with three tension members designed as flexible plates, whilst the connecting points of the pipe to the neighbouring parts are illustrated in elevation.

Fig. 2 shows on a larger scale a longitudinal section through one of the flexible joints and the adjacent pipe sections, the flexible tension plate being shown in section.

Fig. 3 is a section on the line III—III of Fig. 2.

Figs. 4 and 5 show in sections corresponding to that of Fig. 2, other embodiments of the tension members designed as flexible plates.

Fig. 6 is a section on the line VI—VI of Fig. 5.

Fig. 7 shows in an axial, vertical longitudinal section an embodiment in which the tension member designed as a flexible plate is further connected to the adjacent sections of the pipe by web ribs, and Fig. 8 is a section on the line VIII—VIII of Fig. 7.

In Fig. 1 the numerals 1, 2, 3, 4, 5 and 6 denote parts of a metal pipe, the ends of which are connected to the neighbouring parts at 7 and 8. Between these two connecting points 7 and 8 the pipe is provided with three expansion joints 9, 10 and 11, each designed as a bellows joint having only one corrugation and cut along its internal circumference. The flexible joint 9 is rigidly connected along the edges of its cut portion, for instance by welding, to the adjacent pipe sections 1 and 2, whilst the flexible joint 10 is connected in a corresponding manner to the pipe sections 3 and 4 and the flexible joint 11 to the pipe sections 5 and 6. The two pipe sections 1, 2 connected by the flexible joint 9, the pipe sections 3, 4 by the flexible joint 10 and the pipe sections 5, 6 by the flexible joint 11, are each further united by thin, flexible plates 12. These plates 12 arranged in a plane passing through the longitudinal axis of the pipe, are rigidly connected to the adjacent pipe sections, for example by welding. The manner in which this can be done is illustrated on a larger scale, in connection with the pipe sections 3 and 4, in Figs. 2 and 3 wherein the numeral 15 denotes welds.

The plates 12 take up the tensile stresses occurring in the longitudinal direction of the pipe, so that the flexible joints 9, 10 and 11 are practically relieved from any appreciable tensile stresses and consequently need only be designed of sufficient thickness for taking up the stresses occurring in the interior of the bellows joint. Owing to the provision of plates 12 the axial stresses produced in the pipe have not to be transmitted from the connecting points 7 and 8 to special fixed points.

If in a pipe of the kind herein described its length or the distance between the connecting points 7 and 8 are altered relative to another, owing to an expansion of the pipe or because the connecting points have been brought nearer to one another for a reason not connected with expansion of the pipe, then the flexible joints 9, 10, 11 in conjunction with the thin, flexible plates 12 permit deflection of the pipe sections 2, 3, 4 and 5 in a transverse direction to the longitudinal axis of the pipe, as a result of which this axis is displaced from the position A marked by a dot and dash line in Fig. 1 into the new position B marked by a hyphenated line. Such a possibility for the pipe sections to deflect prevents considerable stresses being engendered at the connection points 7 and 8 and likewise prevents bending moments being produced in the pipe itself. The design can consequently be simplified and the reliability increased at the same.

In the embodiment shown in Fig. 4 thin internal bridges 17, 18 are provided at the flexible joint as tension members, whilst in the embodiment shown in Figs. 5 and 6 thin external bridges 19 and 20 are provided, which likewise act as flexible plates. The plates 17, 18 and 19, 20 are also in these cases arranged in a plane passing through the longitudinal axis of the pipe so that the pipe sections which they unite are allowed to deflect in a direction transverse to the longitudinal axis of the pipe.

To supplement the connection between the tension plates and the respective adjacent parts of the metal pipe, special web ribs can be provided as illustrated in Figs. 7 and 8, where apart from the welds 22 the ribs 21 effect an additional connection between the flexible plate 23 and the pipe sections 24, 25. Hereby, however, the distance between the ribs 21 in the longitudinal direction of the pipe must be sufficiently great to ensure that the portion of plate 23 lying between these ribs 21, is still sufficiently flexible to allow deflection of the pipe sections 24, 25 in a direction transverse to the longitudinal axis of the pipe.

In place of annular bellows joints cut along their internal circumference, also flexible joints of U-shaped or similar section may be adopted. Annular flexible joints cut along their external circumference can also be employed. Such flexible joints can be secured in any suitable manner to the adjacent pipe section, thus for instance by riveting, bolting or the like. The invention can be applied in the manner herein described also when more than three flexible joints are inserted at points between the ends of a metal pipe.

What is claimed is:

1. A metal pipe comprising at least four sections arranged end to end; at least three flexible tubular connectors each interposed between the two proximate ends of adjacent sections of the pipe, said connectors being secured to the adjacent pipe sections; and thin, flexible plates extending between each two of said sections bridging the interposed connector while uniting adjacent sections, said plates acting as tension members and being arranged in a plane passing through the longitudinal axis of the pipe so that they may flex and thus allow the pipe sections to deflect in a direction transverse to the longitudinal axis of the pipe.

2. A metal pipe comprising at least four sections arranged end to end; at least three bellows connectors each having only one corrugation and arranged at points between the two proximate ends of adjacent sections of the pipe, said bellows connectors being secured to adjacent pipe sections; and thin, flexible plates extending between each two of said sections bridging said connectors and additionally uniting the pipe sections, said plates acting as tension members and being arranged in a plane passing through the longitudinal axis of the pipe so that they may flex and thus allow the pipe sections to deflect in a direction transverse to the longitudinal axis of the pipe.

3. A metal pipe comprising at least four sections arranged end to end; at least three bellows connectors each having only one corrugation and interposed between the two proximate ends of adjacent sections of the pipe, said bellows connectors being secured to the proximate pipe sections; and thin, flexible plates extending between each two of said sections bridging said connectors and additionally uniting the pipe sections, each of said flexible plates being rigidly connected at its opposite ends to respective pipe sections which it unites and being arranged in a plane passing through the longitudinal axis of the pipe so that it may flex and thus allow the pipe sections which it unites and which are further connected together by one of said bellows connectors, to deflect in a direction transverse to the longitudinal axis of the pipe.

4. A metal pipe comprising at least four sections arranged end to end; at least three bellows connectors interposed between the two proximate ends of adjacent sections of the pipe, said bellows connectors having a single corrugation which is outwardly convex, the connectors being secured to the adjacent pipe sections; and thin, flexible plates extending between each two pipe sections bridging said connectors and additionally uniting the pipe sections, each of said flexible plates being rigidly connected at its opposite ends to respective pipe sections which it unites and being arranged in a plane passing through the longitudinal axis of the pipe so that it may flex and thus allow the pipe sections which it unites and which are further connected together by one of said bellows connectors, to deflect in a direction transverse to the longitudinal axis of the pipe.

ROBERT WIEDERKEHR.